United States Patent [19]

Tiffany

[11] Patent Number: 5,031,807
[45] Date of Patent: Jul. 16, 1991

[54] BICYCLE BRIEF CASE

[76] Inventor: Todd D. Tiffany, 625 W. McKellips, #89, Mesa, Ariz. 85201

[21] Appl. No.: 532,607

[22] Filed: Jun. 4, 1990

[51] Int. Cl.⁵ .............................. B62J 7/00; B62J 9/00
[52] U.S. Cl. ................................. 224/35; 224/320 R; 150/108; 383/119
[58] Field of Search ................... 224/35, 39, 42, 32 R, 224/30 A, 32 A, 231; 150/108, 130; 383/7, 38, 119, 33, 104; 2/255, 256, 257, 248

[56] References Cited

U.S. PATENT DOCUMENTS

| | | | |
|---|---|---|---|
| 603,018 | 4/1898 | Beck | 224/30 R |
| 618,612 | 1/1899 | Parsons | 224/35 |
| 1,362,162 | 12/1920 | Bradley | 224/35 |
| 1,485,067 | 2/1924 | Bristol | 224/30 R |
| 2,457,422 | 12/1948 | Warner | 383/120 |
| 3,837,546 | 9/1974 | Westermann | 224/35 |
| 3,970,229 | 7/1976 | Norinsky | 224/35 |
| 4,301,952 | 11/1981 | McNeill | 224/32 A |
| 4,580,706 | 4/1986 | Jackson et al. | 224/32 A |
| 4,720,027 | 1/1988 | Board | 224/35 |
| 4,763,763 | 8/1988 | Sadow | 150/108 |
| 4,869,408 | 9/1989 | Lutz | 224/32 A |
| 4,955,516 | 9/1990 | Sutterfield | 224/35 |

FOREIGN PATENT DOCUMENTS

| | | | |
|---|---|---|---|
| 300622 | 1/1989 | European Pat. Off. | 383/33 |
| 438870 | 12/1926 | Fed. Rep. of Germany | 224/35 |
| 810916 | 1/1937 | France | 224/35 |

Primary Examiner—Ernest G. Cusick
Assistant Examiner—Keith Kupferschmid
Attorney, Agent, or Firm—Louise S. Heim

[57] ABSTRACT

A briefcase is configured as a saddle bag having two soft-sided pouches joined together by a central bridge portion. The pouches are shaped to fit within the space enclosed by the front post, the bottom brace, and the horizontal cross bar of a bicycle frame. Fastening straps are provided for fastening the rear edge of the briefcase to the seat post and the front edge to the bottom brace. An adjustable carrying strap is secured to the central bridge portion of the briefcase to allow it to be used as a hand or shoulder bag. Removable stiffening rods extend along either side of the bridge portion to prevent the pouches from sagging when the bag is lifted by the carrying strap.

8 Claims, 1 Drawing Sheet

U.S. Patent
July 16, 1991
5,031,807
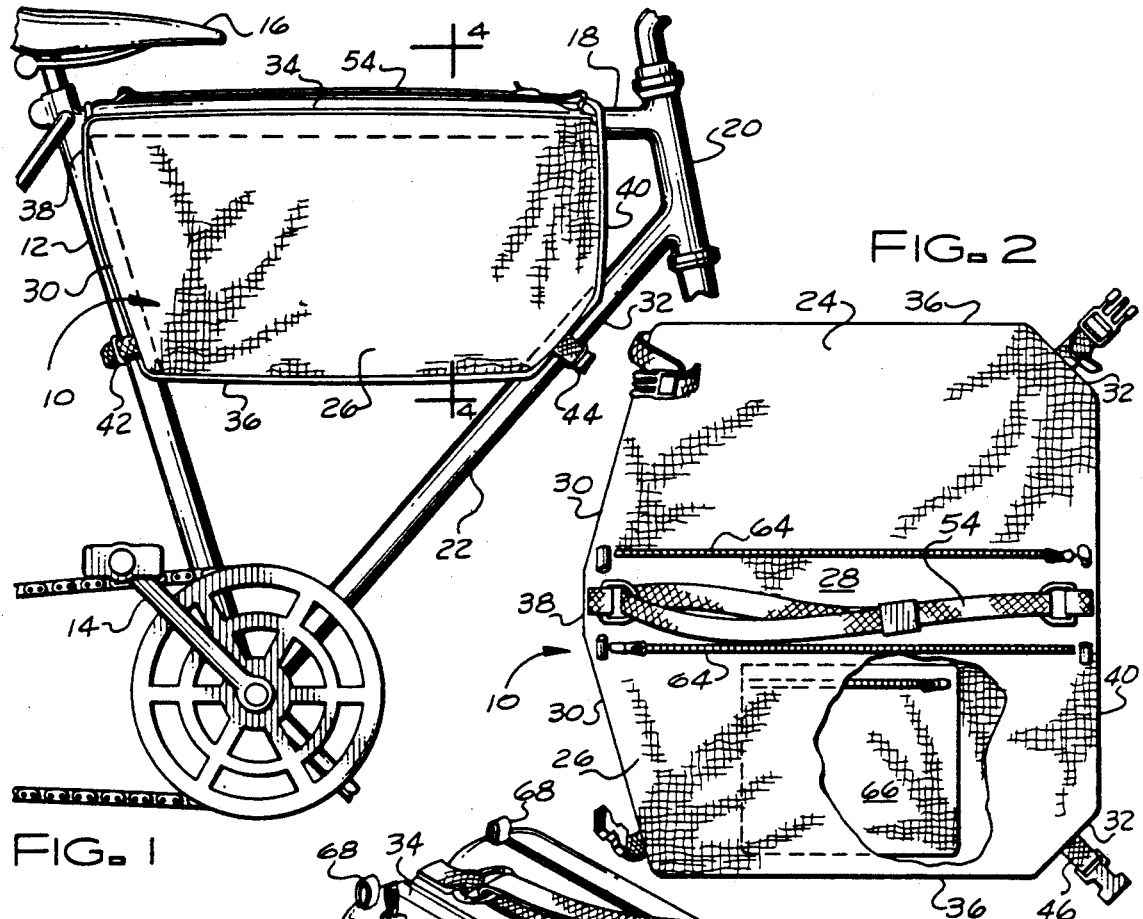
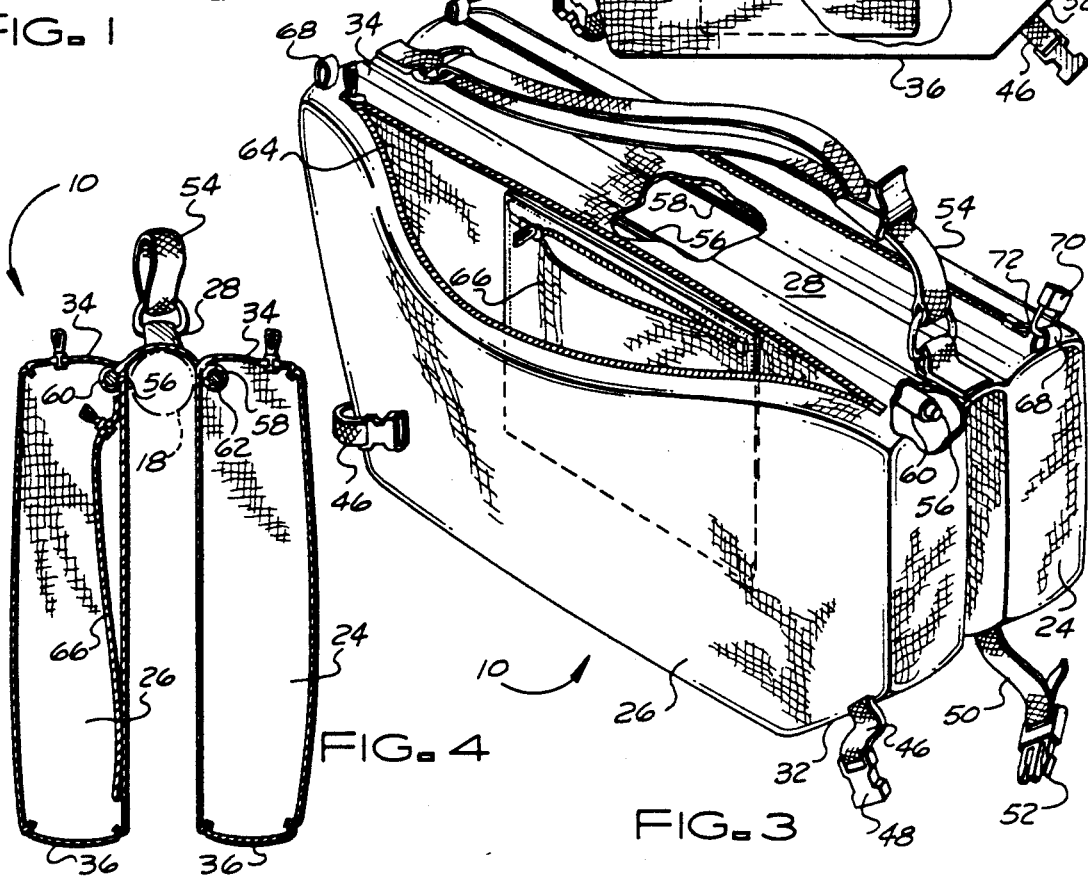

BICYCLE BRIEF CASE

BACKGROUND OF THE INVENTION

1. Field of the Invention

This invention relates in general to bicycle accessories and, more particularly, to a briefcase designed especially to be detachably mounted on and carried between the seat and handlebars of a bicycle.

2. Description of the Prior Art

Due to a number of different factors, among them the nation's increased attention to physical fitness and awareness of environmental issues, as well as the growing amount of congestion on the nation's highways, a number of short-distance commuters have been turning to the bicycle as their preferred form of transportation. One problem that bicycle commuters find, however, is that no suitable means is available for storing and carrying important papers, books and other supplies which the commuter may need for office or school.

Many bike riders, particularly students, carry their supplies in backpacks. However, backpacks are unsatisfactory for a number of reasons. First of all, the shape and construction of a standard backpack does not allow for the neat, orderly storage of flat, easily crumpled items such as individual sheets of paper or the like. In addition, a backpack filled with heavy items such as books tends to be cumbersome and to weigh the rider down. Furthermore, although backpacks may look appropriate for the casual style adopted by students, they tend to detract from the image most professionals would like to project.

As an alternative to the backpack, some people carry their supplies in baskets attached to the handlebars or rear of their bicycles. Such baskets however, are usually designed for 3-speed bicycles and, for both aesthetic and practical reasons, are not suitable for sporty 10-speed models. In addition, because most bicycle baskets are open, their contents present an easy temptation to would-be thieves, and are vulnerable to damage from rain, snow, and other bad weather.

In response to the above problems, a few prior art attempts have been made to design bags specifically for mounting between the seat and handlebars of 10-speed bicycles. Each of the prior art bags can be categorized as one of two types—hard-sided bags or soft-sided bags. Most hard sided bags, which are made from a rigid material such as leather or molded plastic, have been prohibitively expensive to manufacture. On the other hand, prior art soft-sided bags, which are generally made from fabric, have been much less expensive but have been so soft and limp as to completely lose their shape when lifted from the cross bar of the bicycle. As a result, none of the prior art bicycle bags of either category have achieved any degree of commercial acceptance.

It would be highly advantageous, therefore, to remedy the foregoing and other deficiencies inherent in the prior art.

Accordingly, it is an object of the present invention to provide an new and improved briefcase for mounting between the handlebars and the seat of a bicycle.

Another object of the invention is to provide a bicycle briefcase with fasteners for demountably securing the front, rear, and top edges of the briefcase to the bottom brace, the seat post, and the cross bar, respectively, of the bicycle frame in order to prevent horizontal or vertical movement of the case with respect to the frame.

Still another object of the invention is the provision of a briefcase which can be mounted on the crossbar of a bicycle or conveniently converted into a shoulder or handbag.

Yet another object of the invention is to provide a soft-sided bicycle briefcase which will retain its shape when lifted from the crossbar of a bicycle.

Yet still another object of the invention is the provision of a bicycle briefcase which is convenient to clean.

And still a further object of the invention is the provision of a bicycle briefcase with a unique, attractive appearance suitable for business professionals as well as students.

And yet a further object of the invention is to provide a bicycle briefcase, according to the foregoing, which is relatively inexpensive to manufacture.

SUMMARY OF THE INVENTION

Briefly, to achieve the desired objects of the instant invention in accordance with the preferred embodiment thereof, a bicycle briefcase is provided for conveniently storing and transporting items between the seat and the handlebars of a bicycle.

The briefcase is constructed from a relatively flexible material, and is configured essentially as a saddle bag, with two identical soft-sided pouches integrally joined together at the top by a central bridge portion. An adjustable strap is secured to the central bridge portion to allow the case to be easily carried by hand or worn as a shoulder bag after removal from the bike. In addition, stiffening means are provided to prevent the two pouches from sagging when the bag is lifted by the strap. The stiffening means are removable to allow the bag to be easily thrown into a washing machine and cleaned without damage.

Each of the two pouches of the briefcases comprises a number of linear edges, including an inclined rear edge substantially coextensive with the seat post of a bicycle frame, an inclined front edge substantially coextensive with the bottom brace of the bicycle frame, and a horizontal top edge substantially coextensive with the horizontal crossbar of the bicycle. Connector straps are secured to the front and rear edges of each pouch for encircling the bottom brace and seat post, respectively, of the bicycle frame, with the distal ends of each of the straps being provided with fastener means for demountable interconnection with mating fastener means on the other pouch.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a side view showing a briefcase according to the present invention mounted on the frame of a bicycle.

FIG. 2 is a top view of the briefcase in a flattened position, with a portion broken away to show the inner structure.

FIG. 3 is a perspective view of the briefcase, with one pouch unzipped, and a portion of the central bridge broken away to show the inner structure.

FIG. 4 is a sectional view taken through line 4—4 of FIG. 1.

DETAILED DESCRIPTION OF THE PREFERRED EMBODIMENT

Turning now to the drawings in which like reference characters indicate corresponding elements throughout the several views, attention is first directed to FIG. 1, which shows a briefcase according to the instant invention, indicated in its entirety by the numeral 10. The briefcase 10 is mounted on the frame of a conventional 10-speed bicycle. The frame includes an inclined seat post 12 which extends upwardly and rearwardly between the pedals 14 and the seat 16 of the bicycle, a horizontal crossbar 18 which extends from near the top of seat post 12 to near the top of the front post 20, and a bottom brace 22 which extends diagonally upwardly from the bottom of the seat post 12 to the bottom of the front post 20.

The briefcase 10 is constructed from a relatively flexible, yet durable material such as canvas or denim, and is configured essentially as a saddlebag, with two identical soft-sided pouches 24, 26 joined together by a central bridge portion 28. The briefcase 10 is configured to fit within the space enclosed by the seat post 12, front post 20, cross bar 18 and bottom brace 22 of the bicycle. Thus, each pouch 24, 26 is provided with an inclined rear edge 30, an inclined front edge 32, and a horizontal top edge 34, each of which is substantially coextensive with a respective one of the bars 12, 32, 18 of the bicycle frame. In addition, each of the pouches 24, 26 preferably has a flat bottom edge 36 and a pair of vertical side edges 38, 40 extending between the rear and front edges 30, 32, respectively, and the top edge 34.

In order to maintain the briefcase 10 in a stable position on the bicycle frame and to prevent the two pouches 24, 26 from swinging away from one another when the bicycle is in motion, connector straps 42, 44 are secured to the front and rear edges 32, 30 of the pouches 24, 26 for encircling the bottom brace 22 and the seat post 12. Preferably, each connector strap comprises a first strap half 46 having one end permanently secured to one of the pouches 26 and a female fastening element 48 carried at the other end. A second strap half 50 has one end permanently secured to the other pouch 24 and a male fastening element 52 carried at the other end. The male fastening element 52 is simply inserted into the female element 48 when the bag 10 is being mounted on the bicycle frame and pulled out of the female element when the briefcase 10 is being removed. The length of one of the strap halves 46, 50 is adjustable so that the briefcase can be mounted on bicycles of varying sizes.

A carrying strap 54 is secured to the bridge portion 28 to allow the briefcase 10 to be conveniently lifted from the crossbar 18 and conveniently carried from place to place. The length of carrying strap 54 is preferably adjustable so that the briefcase can be used as either a handbag or a shoulder bag.

In order to prevent the briefcase 10 from losing its shape when lifted by carrying strap 54, stiffening means are provided along central bridge portion 28. In the illustrated embodiment of the invention, the stiffening means are in the form of a pair of rigid rods 56, 58, which are mounted in tubular sleeves 60, 62 formed along the upper rear edge of each of the pouches 24, 26 adjacent opposite sides of the bridge portion 28. Each of the sleeves 60, 62 is open at one end, so that the rods 56, 58 may conveniently be removed. Removal of the rods 56, 58 allows the briefcase 10 to be placed in a conventional washing machine and cleaned without damage to any of its parts.

Preferably, access to each of the pouches 24, 26 is gained through a zippered opening 64 in the top of the pouch. An additional zippered storage compartment 66 may be formed in the rear wall of one or both of the pouches for storing small items such as pens, pencils, index cards and the like. Alternative arrangements of pockets and storage compartments may be provided according to the intended use of the briefcase 10. For instance, if the briefcase is intended to be marketed as a sports bag, additional elongated pockets may be added for storing tennis balls and the like. Alternatively, the briefcase could be marketed as a beach bag, and additional compartments added for holding sunscreen and tanning lotion and the like.

An additional optional feature of the briefcase 10 is the provision of loops 68 along the upper front and rear edges of the bag at opposite ends of the zippered opening 66. These loops 68 serve as convenient attachment points to which a conventional padlock 70 may be affixed. By extending the U-shaped locking bar of the padlock 70 through a loop 68 and the adjacent zipper head 72, the user can prevent unauthorized entry into each of the pouches 24, 26.

Various modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

1. A briefcase for mounting on a bicycle frame including an inclined seat post, an inclined front post, a horizontal cross bar, and a diagonal bottom brace, said briefcase comprising:
   a) a pair of soft-sided pouches constructed from substantially flexible material, each of said pouches including a rear side, a front side, a top side, and a bottom side;
   b) a central bridge portion joining said pouches together for suspending said briefcase from the horizontal cross bar of the bicycle frame;
   c) first fastening means for releasably securing said rear side of said pouches to the seat post of the bicycle frame;
   d) second fastening means for releasably securing said front side of said pouches to the bottom brace of the bicycle;
   e) handle means secured to said central portion for allowing said briefcase to be removed from the crossbar and carried by hand;
   f) stiffening means for preserving the shape of said briefcase when said briefcase is lifted by said handle means, said stiffening means comprising a rod mounted in each of said pouches adjacent said central bridge portion; and
   g) retaining means for removably retaining said rods in said pouches, said retaining means including i) a sleeve formed in each of said pouches along the intersection between said pouch and said central bridge portion, and ii) an opening formed at one end of each sleeve for allowing said rod to be removed to permit machine washing of said briefcase.

2. A briefcase according to claim 1, further comprising adjustment means on said handle means for allowing said handle to be converted to a shoulder strap.

3. A briefcase according to claim 1, wherein each of said pouches comprises:

a) an inclined rear edge substantially coextensive with the inclined seat post of the bicycle frame;

b) an inclined front edge substantially coextensive with the diagonal bottom brace of the bicycle frame; and c) a horizontal top edge substantially coextensive with the horizontal cross bar of the bicycle frame.

4. A briefcase according to claim 1, in which said first and second fastener means comprise fastener straps for encircling the seat post and the bottom brace, respectively of the bicycle frame, each of said straps having a first end permanently secured to one of said pouches, a second end, and means for detachably connecting said second end of said strap to the other of said pouches.

5. A briefcase according to claim 4, in which said means for detachably connecting said second end of said strap to said other pouch comprises:

a) a first element on said second end of said strap; and b) a second element on said other pouch for cooperating with said first element to form a detachable connection between said strap and said other pouch.

6. A briefcase for mounting on a bicycle frame including an inclined seat post, an inclined front post, a horizontal cross bar, and a diagonal bottom brace, said briefcase comprising:

a) a pair of soft-sided pouches constructed from substantially flexible material, each of said pouches including a rear side, a front side, a top side, and a bottom side;

b) a central bridge portion joining said pouches together for suspending said briefcase from the horizontal cross bar of the bicycle frame;

c) first fastening means for releasably securing said rear side of said pouches to the seat post of the bicycle frame;

d) second fastening means for releasably securing said front side of said pouches to the bottom brace of the bicycle;

e) handle means secured to said central portion for allowing said briefcase to be removed from the crossbar and carried by hand;

f) stiffening means mounted proximate said central bridge portion for preserving the shape of said briefcase when said briefcase is lifted by said handle means; and g) retaining means for removably retaining said stiffening means in said briefcase, said retaining means including i) at least one sleeve formed proximate the intersection between said pouch and said central bridge portion, and ii) an opening formed at one end of said sleeve for allowing said stiffening means to be removed to permit machine washing of said briefcase.

7. A briefcase according to claim 6, in which said stiffening means comprises a pair of stiffening elements, each of said stiffening elements being mounted in a different one of said pouches along said central bridge portion.

8. A briefcase according to claim 7, wherein said at least one sleeve comprises a pair of sleeves, each of said sleeves being mounted in a different one of said pouches proximate said central bridge portion and corresponding to a different one of said stiffening elements.

* * * * *